(12) United States Patent
Wells et al.

(10) Patent No.: US 10,341,719 B2
(45) Date of Patent: *Jul. 2, 2019

(54) ENTRY ADAPTER FOR COMMUNICATING EXTERNAL SIGNALS TO AN INTERNAL NETWORK AND COMMUNICATING CLIENT SIGNALS IN THE CLIENT NETWORK

(71) Applicant: PPC Broadband, Inc., East Syracuse, NY (US)

(72) Inventors: Chad T. Wells, Centennial, CO (US); John M. Egan, Jr., Franktown, CO (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/891,441

(22) Filed: Feb. 8, 2018

(65) Prior Publication Data
US 2018/0167669 A1 Jun. 14, 2018

Related U.S. Application Data

(63) Continuation of application No. 15/722,302, filed on Oct. 2, 2017, now Pat. No. 10,154,302, which is a (Continued)

(51) Int. Cl.
*H04N 7/18* (2006.01)
*H04N 21/436* (2011.01)
(Continued)

(52) U.S. Cl.
CPC ... *H04N 21/43615* (2013.01); *H04L 12/2801* (2013.01); *H04N 7/104* (2013.01);
(Continued)

(58) Field of Classification Search
CPC ..................................................... H04N 21/61
See application file for complete search history.

(56) References Cited

U.S. PATENT DOCUMENTS 2,662,217 A 12/1953 Roberts
3,790,909 A 2/1974 LeFevre
(Continued)

FOREIGN PATENT DOCUMENTS

CN 200941620 Y 8/2007
CN 201048432 Y 4/2008
(Continued)

OTHER PUBLICATIONS

Author Unknown, Office Action dated Jul. 31, 2014, Chinese Application No. 201110037086.1, filed Jan. 21, 2011, pp. 1-6.
(Continued)

*Primary Examiner* — Gigi L Dubasky
(74) *Attorney, Agent, or Firm* — MH2 Technology Law Group LLP (57) ABSTRACT

A entry adapter configured to allow external signals to be received by the entry adapter and including a first splitter electrically connected to a first port and a second port. The entry adapter includes a frequency band rejection device electrically connected to the first splitter, and configured to allow the external signals to proceed therethrough to a plurality of third ports, and to block the client signals from proceeding therethrough to the first port. The entry adapter also includes a second splitter electrically connected to the frequency band rejection device and the plurality of third ports, and configured to distribute the external signals received from the frequency band rejection device to the plurality of third ports. The external signals do not proceed through the second splitter.

38 Claims, 3 Drawing Sheets

Related U.S. Application Data continuation of application No. 15/133,948, filed on Apr. 20, 2016, now Pat. No. 9,781,472, which is a continuation of application No. 13/863,693, filed on Apr. 16, 2013, now Pat. No. 9,351,051, which is a continuation-in-part of application No. 13/688,420, filed on Nov. 29, 2012, now Pat. No. 9,167,286, and a continuation-in-part of application No. 12/704,833, filed on Feb. 12, 2010, now Pat. No. 8,429,695, which is a continuation-in-part of application No. 12/563,719, filed on Sep. 21, 2009, now Pat. No. 8,356,322, which is a continuation-in-part of application No. 12/255,008, filed on Oct. 21, 2008, now Pat. No. 8,286,209.

(51) Int. Cl.
  *H04N 21/63* (2011.01)
  *H04L 12/28* (2006.01)
  *H04N 21/61* (2011.01)
  *H04N 7/10* (2006.01)

(52) U.S. Cl.
  CPC ..... *H04N 21/6118* (2013.01); *H04N 21/6168* (2013.01); *H04N 21/63* (2013.01)

(56) References Cited

U.S. PATENT DOCUMENTS

| | | |
|---|---|---|
| 3,939,431 A | 2/1976 | Cohlman |
| 4,027,219 A | 5/1977 | Van Alphen et al. |
| 4,306,403 A | 12/1981 | Hubbard et al. |
| 4,344,499 A | 8/1982 | Van der Lely et al. |
| 4,512,033 A | 4/1985 | Schrock |
| 4,520,508 A | 5/1985 | Reichert, Jr. |
| 4,648,123 A | 3/1987 | Schrock |
| 4,677,390 A | 6/1987 | Wagner |
| 4,715,012 A | 12/1987 | Mueller, Jr. |
| 4,961,218 A | 10/1990 | Kiko |
| 4,982,440 A | 1/1991 | Dufresne et al. |
| 5,010,399 A | 4/1991 | Goodman et al. |
| 5,126,686 A | 6/1992 | Tam |
| 5,126,840 A | 6/1992 | Dufresne et al. |
| 5,214,505 A | 5/1993 | Rabowsky et al. |
| 5,231,660 A | 7/1993 | West, Jr. |
| 5,245,300 A | 9/1993 | Sasaki et al. |
| 5,369,642 A | 11/1994 | Shioka et al. |
| 5,485,630 A | 1/1996 | Lee et al. |
| 5,548,255 A | 8/1996 | Spielman |
| 5,557,319 A | 9/1996 | Gurusami et al. |
| 5,557,510 A | 9/1996 | McIntyre et al. |
| 5,604,528 A | 2/1997 | Edwards et al. |
| 5,719,792 A | 2/1998 | Bush |
| 5,740,044 A | 4/1998 | Ehrenhardt et al. |
| 5,745,836 A | 4/1998 | Williams |
| 5,745,838 A | 4/1998 | Tresness et al. |
| 5,815,794 A | 9/1998 | Williams |
| 5,839,052 A | 11/1998 | Dean et al. |
| 5,893,024 A | 4/1999 | Sanders et al. |
| 5,937,330 A | 8/1999 | Vince et al. |
| 5,950,111 A | 9/1999 | Georger et al. |
| 5,970,053 A | 10/1999 | Schick et al. |
| 6,012,271 A | 1/2000 | Wilkens et al. |
| 6,014,547 A | 1/2000 | Caporizzo et al. |
| 6,049,693 A | 4/2000 | Baran et al. |
| 6,069,960 A | 5/2000 | Mizukami et al. |
| 6,094,211 A | 7/2000 | Baran et al. |
| 6,101,932 A | 8/2000 | Wilkens |
| 6,128,040 A | 10/2000 | Shinbori et al. |
| 6,129,187 A | 10/2000 | Bellanger et al. |
| 6,173,225 B1 | 1/2001 | Stelzle et al. |
| 6,185,432 B1 | 2/2001 | Vembu |
| 6,205,138 B1 | 3/2001 | Nihal et al. |
| 6,229,375 B1 | 5/2001 | Koen |
| 6,348,837 B1 | 2/2002 | Ibelings |
| 6,348,955 B1 | 2/2002 | Tait |
| 6,373,349 B2 | 4/2002 | Gilbert |
| 6,377,316 B1 | 4/2002 | Mycynek et al. |
| 6,388,539 B1 | 5/2002 | Rice |
| 6,425,132 B1 | 7/2002 | Chappell |
| 6,430,904 B1 | 8/2002 | Coers et al. |
| 6,495,998 B1 | 12/2002 | Terreault |
| 6,498,925 B1 | 12/2002 | Tauchi |
| 6,510,152 B1 | 1/2003 | Gerszberg et al. |
| 6,546,705 B2 | 4/2003 | Scarlett et al. |
| 6,550,063 B1 | 4/2003 | Matsuuara |
| 6,560,778 B1 | 5/2003 | Hasegawa |
| 6,570,928 B1 | 5/2003 | Shibata |
| 6,587,012 B1 | 7/2003 | Farmer et al. |
| 6,622,304 B1 | 9/2003 | Carhart |
| 6,640,338 B1 | 10/2003 | Shibata |
| 6,678,893 B1 | 1/2004 | Jung |
| 6,683,513 B2 | 1/2004 | Shamsaifar et al. |
| 6,725,462 B1 | 4/2004 | Kaplan |
| 6,728,968 B1 | 4/2004 | Abe et al. |
| 6,737,935 B1 | 5/2004 | Shafer |
| 6,757,910 B1 | 6/2004 | Bianu |
| 6,758,292 B2 | 7/2004 | Shoemaker |
| 6,804,828 B1 | 10/2004 | Shibata |
| 6,843,044 B2 | 1/2005 | Clauss |
| 6,845,232 B2 | 1/2005 | Darabi |
| 6,920,614 B1 | 1/2005 | Schindler et al. |
| 6,868,552 B1 | 3/2005 | Masuda et al. |
| 6,877,166 B1 | 4/2005 | Roeck et al. |
| 6,915,530 B1 | 7/2005 | Kauffman et al. |
| 6,928,175 B1 | 8/2005 | Bader et al. |
| 6,942,595 B2 | 9/2005 | Hrazdera |
| 7,003,275 B1 | 2/2006 | Petrovic |
| 7,029,293 B2 | 4/2006 | Shapson et al. |
| 7,039,432 B2 | 5/2006 | Strater et al. |
| 7,048,106 B2 | 5/2006 | Hou |
| 7,127,734 B1 | 10/2006 | Amit |
| 7,162,731 B2 | 1/2007 | Reidhead et al. |
| 7,254,827 B1 | 8/2007 | Terreault |
| 7,283,479 B2 | 10/2007 | Ljungdahl et al. |
| 7,399,255 B1 | 7/2008 | Johnson et al. |
| 7,404,355 B2 | 7/2008 | Viaud et al. |
| 7,416,068 B2 | 8/2008 | Ray et al. |
| 7,454,252 B2 | 11/2008 | El-Sayed |
| 7,464,526 B2 | 12/2008 | Coenen |
| 7,505,819 B2 | 3/2009 | El-Sayed |
| 7,508,284 B2 | 3/2009 | Shafer |
| 7,530,091 B2 | 5/2009 | Vaughan |
| 7,592,883 B2 | 9/2009 | Shafer |
| 7,675,381 B2 * | 3/2010 | Lin ............ H03H 7/46 |
| | | 333/101 |
| 7,742,777 B2 | 6/2010 | Strater et al. |
| 7,783,195 B2 | 8/2010 | Riggsby |
| 8,179,814 B2 | 5/2012 | Shafer et al. |
| 8,181,208 B1 | 5/2012 | Elwardani |
| 8,286,209 B2 * | 10/2012 | Egan, Jr. ............ H04N 7/104 |
| | | 725/127 |
| 8,356,322 B2 | 1/2013 | Wells et al. |
| 8,429,695 B2 * | 4/2013 | Halik ............ H04N 7/104 |
| | | 725/127 |
| 8,510,782 B2 * | 8/2013 | Wells ............ H04L 12/2801 |
| | | 348/342 |
| 8,752,114 B1 | 6/2014 | Shapson et al. |
| 9,167,286 B2 | 10/2015 | Wells |
| 9,351,051 B2 * | 5/2016 | Wells ............ H04N 21/63 |
| 9,516,376 B2 | 12/2016 | Wells |
| 9,781,472 B2 * | 10/2017 | Wells ............ H04N 21/63 |
| 2001/0016950 A1 | 8/2001 | Matsuura |
| 2002/0069417 A1 | 6/2002 | Kliger |
| 2002/0141347 A1 | 10/2002 | Harp |
| 2002/0144292 A1 | 10/2002 | Uemura et al. |
| 2002/0166124 A1 | 11/2002 | Gurantz et al. |
| 2002/0174423 A1 | 11/2002 | Fifield et al. |
| 2003/0005450 A1 | 1/2003 | Smith |
| 2003/0084458 A1 | 5/2003 | Ljungdahl et al. |
| 2004/0147273 A1 | 7/2004 | Morphy |
| 2004/0172659 A1 | 9/2004 | Ljungdahl et al. |
| 2004/0229561 A1 | 11/2004 | Cowley et al. |

(56) References Cited

U.S. PATENT DOCUMENTS

| | | |
|---|---|---|
| 2005/0034168 A1 | 2/2005 | Beveridge |
| 2005/0047051 A1 | 3/2005 | Marland |
| 2005/0144649 A1 | 6/2005 | Bertonis |
| 2005/0183130 A1 | 8/2005 | Sadja et al. |
| 2005/0210977 A1 | 9/2005 | Yan |
| 2005/0283815 A1 | 12/2005 | Brooks et al. |
| 2005/0289632 A1 | 12/2005 | Brooks et al. |
| 2006/0015921 A1 | 1/2006 | Vaughan |
| 2006/0041918 A9 | 2/2006 | Currivan et al. |
| 2006/0117371 A1 | 6/2006 | Margulis |
| 2006/0191359 A1 | 8/2006 | Tarasinski et al. |
| 2006/0205442 A1 | 9/2006 | Phillips et al. |
| 2006/0241838 A1 | 10/2006 | Mongiardo et al. |
| 2006/0282871 A1 | 12/2006 | Yo |
| 2007/0024393 A1 | 2/2007 | Forse et al. |
| 2007/0288981 A1 | 12/2007 | Mitsuse et al. |
| 2007/0288982 A1 | 12/2007 | Donahue |
| 2008/0001645 A1 | 1/2008 | Kuroki |
| 2008/0013612 A1 | 1/2008 | Miller et al. |
| 2008/0022344 A1 | 1/2008 | Riggsby |
| 2008/0040764 A1 | 2/2008 | Weinstein et al. |
| 2008/0120667 A1 | 5/2008 | Zaltsman |
| 2008/0127287 A1 | 5/2008 | Alkan et al. |
| 2008/0157898 A1 | 7/2008 | Palinkas et al. |
| 2008/0168518 A1 | 7/2008 | Hsue et al. |
| 2008/0225902 A1 | 9/2008 | Chung |
| 2008/0247401 A1 | 10/2008 | Bhal et al. |
| 2008/0247541 A1 | 10/2008 | Cholas et al. |
| 2008/0271094 A1* | 10/2008 | Kliger ............... H04L 12/2801 725/80 |
| 2008/0313691 A1 | 12/2008 | Cholas et al. |
| 2009/0031391 A1 | 1/2009 | Urbanek |
| 2009/0047919 A1 | 2/2009 | Phillips et al. |
| 2009/0077608 A1* | 3/2009 | Romerein ............ H03H 7/463 725/127 |
| 2009/0153263 A1 | 6/2009 | Lin |
| 2009/0165070 A1 | 6/2009 | McMullin et al. |
| 2009/0180782 A1 | 7/2009 | Bernard et al. |
| 2009/0217325 A1 | 8/2009 | Kliger et al. |
| 2009/0320086 A1 | 12/2009 | Rijssemus et al. |
| 2010/0017842 A1 | 1/2010 | Wells |
| 2010/0095344 A1 | 4/2010 | Newby |
| 2010/0100918 A1 | 4/2010 | Egan |
| 2010/0125877 A1 | 5/2010 | Wells |
| 2010/0146564 A1 | 6/2010 | Halik |
| 2010/0162340 A1 | 6/2010 | Riggsby |
| 2010/0194489 A1 | 8/2010 | Kearns et al. |
| 2010/0225813 A1 | 9/2010 | Hirono et al. |
| 2011/0002245 A1 | 1/2011 | Wall et al. |
| 2011/0010749 A1 | 1/2011 | Alkan |
| 2011/0051014 A1 | 3/2011 | Wang et al. |
| 2011/0069740 A1 | 3/2011 | Cowley et al. |
| 2011/0072472 A1 | 3/2011 | Wells |
| 2011/0181371 A1 | 7/2011 | Alkan |
| 2011/0258677 A1 | 10/2011 | Shafer |
| 2012/0054805 A1 | 3/2012 | Shafer |
| 2012/0054819 A1 | 3/2012 | Alkan |
| 2012/0081190 A1 | 4/2012 | Rijssemus |
| 2012/0159556 A1 | 6/2012 | Alkan |
| 2012/0331501 A1 | 12/2012 | Shafer |
| 2013/0081096 A1 | 3/2013 | Wells et al. |
| 2013/0181789 A1 | 7/2013 | Rijssemus |
| 2013/0227632 A1 | 8/2013 | Wells et al. |
| 2013/0283334 A1 | 10/2013 | Tsao et al. |

FOREIGN PATENT DOCUMENTS

| | | |
|---|---|---|
| JP | 55-080989 A | 6/1980 |
| JP | 55-132126 A | 10/1980 |
| JP | 58-99913 | 12/1981 |
| JP | 57-091055 A | 6/1982 |
| JP | 58-101582 A | 6/1983 |
| JP | 59026709 | 8/1984 |
| JP | 61-157035 A | 7/1986 |
| JP | 05-191416 A | 7/1993 |
| JP | 07-038580 A | 2/1995 |
| JP | 11-069334 A | 3/1999 |
| JP | 2001-177580 A | 6/2001 |
| JP | 2004-080483 | 3/2004 |
| JP | 2005-005875 | 1/2005 |
| JP | 2007-166109 A | 6/2007 |
| JP | 2007-166110 A | 6/2007 |
| WO | 0024124 A1 | 4/2000 |
| WO | 0172005 A1 | 9/2001 |
| WO | 0233969 A1 | 4/2002 |
| WO | 02091676 A1 | 11/2002 |

OTHER PUBLICATIONS

Sung Lark Kwon (Authorized Officer), International Search Report dated May 31, 2011, PCT Application No. PCT/US2010/049568, filed Sep. 21, 2010, pp. 1-3.

Office Action Summary dated Mar. 6, 2012, U.S. Appl. No. 12/563,719, filed Sep. 21, 2009, pp. 1-13.

Office Action Summary dated Jan. 23, 2012, U.S. Appl. No. 12/250,229, filed Oct. 13, 2008, pp. 1-25.

Office Action Summary dated Nov. 11, 2011, U.S. Appl. No. 12/255,008, filed Oct. 21, 2008, pp. 1-22.

Pre-Interview First Office Action dated Jul. 16, 2018, U.S. Appl. No. 15/880,166, filed Jan. 25, 2018, pp. 1-10.

Pre-Interview First Office Action dated Aug. 3, 2018, U.S. Appl. No. 15/880,363, filed Jan. 25, 2018, pp. 1-30.

First Action Interview Office Action dated Aug. 10, 2018, U.S. Appl. No. 15/890,573, filed Feb. 7, 2018, pp. 1-15.

Pre-Interview First Office Action dated Aug. 10, 2018, U.S. Appl. No. 15/886,788, Feb. 1, 2018, pp. 1-30.

Pre-Interview First Offioe Action dated Jun. 8, 2018, U.S. Appl. No. 15/890,573, filed Feb. 7, 2018, pp. 1-24.

Non-Final Office Action dated May 18, 2018, U.S. Appl. No. 15/722,302, filed Oct. 2, 2017, pp. 1-34.

International Search Report and Written Opinion dated Nov. 2, 2017, PCT Application No. PCT/US2017/040260, filed Jun. 30, 2017, pp. 1-18.

Wells, "Cable Television Entry Adapter", U.S. Appl. No. 13/245,510, filed Sep. 26, 2011.

Non-Final Office Action dated Feb. 26, 2016, U.S. Appl. No. 14/881,686, filed Oct. 13, 2015, pp. 1-6.

Pre-Interview First Office Action dated Aug. 15, 2018, U.S. Appl. No. 15/886,800, filed Feb. 1, 2018, pp. 1-30.

Notice of Allowance dated Sep. 28, 2018, U.S. Appl. No. 15/880,363, filed Jan. 25, 2018, pp. 1-70.

First Action Interview Office action dated Sep. 21, 2018, U.S. Appl. No. 15/880,166, filed Jan. 25, 2018, pp. 1-14.

Notice of Allowance dated Oct. 17, 2018, U.S. Appl. No. 15/890,573, filed Feb. 7, 2018, pp. 1-20.

Notice of Allowance dated Oct. 18, 2018, U.S. Appl. No. 15/880,166, filed Jan. 25, 2018, pp. 1-38.

Notice of Allowance dated Oct. 18, 2018, U.S. Appl. No. 15/886,788, filed Feb. 1, 2018, pp. 1-30.

Notice of Allowance dated May 8, 2019, U.S. Appl. No. 15/880,231, filed Jan. 25, 2018, pp. 1-12.

\* cited by examiner

ENTRY ADAPTER FOR COMMUNICATING EXTERNAL SIGNALS TO AN INTERNAL NETWORK AND COMMUNICATING CLIENT SIGNALS IN THE CLIENT NETWORK

CROSS REFERENCE TO RELATED APPLICATION

This application is a continuation of U.S. patent application Ser. No. 15/722,302, filed on Oct. 2, 2017, which is a continuation of U.S. patent application Ser. No. 5/133,948, filed Apr. 20, 2016, now U.S. Pat. No. 9,781,472, which is a continuation of U.S. patent application Ser. No. 13/863,693, filed Apr. 16, 2013, now U.S. Pat. No. 9,351,051, which is a continuation-in-part of U.S. patent application Ser. No. 12/704,833, filed Feb. 12, 2010, now issued as U.S. Pat. No. 8,429,695, and a continuation-in part of U.S. patent application Ser. No. 12/255,008, filed Oct. 21, 2008, now issued as U.S. patent No. 8,286,209. U.S. patent application Ser. No. 13/863,693, now U.S. Pat. No. 9,351,051, is also a continuation-in-part of U.S. patent application Ser. No. 13/688,420, filed Nov. 29, 2012, now issued as U.S. Pat. No. 9,167,286, which is a continuation of U.S. patent application Ser. No. 12/563,719, filed Sep. 21, 2009, now U.S. Pat. No. 8,356,322. Each of these applications is incorporated by reference herein in its entirety.

FIELD OF THE INVENTION

This invention relates to community access or cable television (CATV) networks and to Multimedia over Coax Alliance (MoCA) in-home entertainment networks. More particularly, the present invention relates to a new and improved CATV entry adapter which conducts CATV downstream and upstream signals between the CATV network and subscriber equipment connected to the entry adapter and MoCA signals between MoCA-enabled devices connected to the entry adapter, while simultaneously preventing the MoCA signals from interfering with the proper functionality of an embedded multimedia terminal adapter (eMTA) device, such as a "lifeline" telephone which is also connected to the entry adapter.

BACKGROUND OF THE INVENTION

CATV networks use an infrastructure of interconnected coaxial cables, signal splitters and combiners, repeating amplifiers, filters, trunk lines, cable taps, drop lines and other signal-conducting devices to supply and distribute high frequency "downstream" signals from a main signal distribution facility, known as a "headend," to the premises (homes and offices) of CATV subscribers. The downstream signals operate the subscriber equipment, such as television sets, telephone sets and computers. In addition, most CATV networks also transmit "upstream" signals from the subscriber equipment back to the headend of the CATV network. For example, the subscriber uses a set top box to select programs for display on the television set. As another example, two-way communication is essential when using a personal computer connected through the CATV infrastructure to the public Internet. As a further example, voice over Internet protocol (VOIP) telephone sets use the CATV infrastructure and the public Internet as the communication medium for transmitting two-way telephone conversations.

To permit simultaneous communication of upstream and downstream CATV signals and the interoperability of the subscriber equipment and the equipment associated with the CATV network infrastructure outside of subscriber premises, the downstream and upstream signals are confined to two different frequency bands. The downstream frequency band is within the range of 54-1002 megahertz (MHz) and the upstream frequency band is within the range of 5-42 MHz, in most CATV networks.

The downstream signals are delivered from the CATV network infrastructure to the subscriber premises at a CATV entry adapter, which is also commonly referred to as an entry device, terminal adapter or a drop amplifier. The entry adapter is a multi-port device which connects at an entry port to a CATV drop cable from the CATV network infrastructure and which connects at a multiplicity of other distribution ports to coaxial cables which extend throughout the subscriber premises to a cable outlet. Each cable outlet is available to be connected to subscriber equipment. Typically, most homes have coaxial cables extending to cable outlets in almost every room, because different types of subscriber equipment may be used in different rooms. For example, television sets, computers and telephone sets are commonly used in many different rooms of a home or office. The multiple distribution ports of the entry adapter deliver the downstream signals to each cable outlet and conduct the upstream signals from the subscriber equipment through the entry adapter to the drop cable and the CATV infrastructure.

In addition to television sets, computers and telephones, a relatively large number of other entertainment and multimedia devices are available for use in homes. For example, a digital video recorder (DVR) is used to record broadcast programming, still photography and moving pictures in a memory medium so that the content can be replayed on a display or television set at a later time selected by the user. As another example, computer games are also played at displays or on television sets. Such computer games may be those obtained over the Internet from the CATV network or from media played on play-back devices connected to displays or television sets. As a further example, receivers of satellite-broadcast signals may be distributed for viewing or listening throughout the home. These types of devices, including the more-conventional television sets, telephone sets and devices connected to the Internet by the CATV network, are generically referred to as multimedia devices.

The desire to use multimedia devices at multiple different locations within the home or subscriber premises has led to the creation of the Multimedia over Coax Alliance (MoCA). MoCA has developed specifications for products to create an in-home entertainment network for interconnecting presently-known and future multimedia devices. A MoCA in-home network uses the subscriber premise or in-home coaxial cable infrastructure originally established for distribution of CATV signals within the subscriber premises, principally because that coaxial cable infrastructure already exists in most homes and is capable of carrying much more information than is carried in the CATV frequency bands. A MoCA network is established by connecting MoCA-enabled or MoCA interface devices at the cable outlets in the rooms of the subscriber premises. These MoCA interface devices implement a MoCA communication protocol which encapsulates the signals normally used by the multimedia devices within MoCA signal packets and then communicates the MoCA signal packets between other MoCA interfaces devices connected at other cable outlets. The receiving MoCA interface device removes the encapsulated multimedia signals from the MoCA signal packets, and delivers the multimedia signals to the connected display, computer or other multimedia device from which the content is presented to the user.

Each MoCA-enabled device is capable of communicating with every other MoCA-enabled device in the in-home or subscriber premises MoCA network to deliver the multimedia content throughout the home or subscriber premises. The multimedia content that is available from one multimedia device can be displayed, played or otherwise used at a different location within the home, without having to physically relocate the originating multimedia device from one location to another within the subscriber premises. The communication of multimedia content is considered beneficial in more fully utilizing the multimedia devices present in modern homes.

Since the operation of the subscriber premises MoCA network must occur simultaneously with the operation of the CATV services, the MoCA signals utilize a frequency range different from the frequency ranges of the CATV upstream and downstream signals. The typical MoCA frequency band is 1125-1525 MHz. This so-called D band of MoCA signals is divided into eight different frequency ranges, D1-D8, and these eight different D frequency ranges are used to assure communication between the selected MoCA-enabled devices. For example, the D-1 band at 1125-1175 MHz may be used to communicate CATV television programming content between a MoCA interface device associated with a set-top box in a main room of the house and another MoCA interface device connected to a television set in bedroom of the house, while a MoCA interface device connected to a computer gaming multimedia device in a basement room of the house simultaneously communicates computer game content over the D-6 band at 1375-1425 MHz to another MoCA interface device associated with a computer located in a recreation room of the house. The MoCA frequency band also includes other frequency ranges, but the D band is of major relevance because of its principal use in establishing connections between the MoCA interface devices.

Although using the subscriber premises coaxial cable infrastructure as the communication medium substantially simplifies the implementation of the MoCA network, there are certain disadvantages to doing so. The MoCA signals have the capability of passing through the CATV entry device and entering the CATV network infrastructure where those MoCA signals may then pass through a drop cable and enter another subscriber's premises. The presence of the MoCA signals at an adjoining subscriber's premises compromises the privacy and security of the information originally intended to be confined only within the original subscriber premises. The MoCA signals from the original subscriber premises which enter through the CATV network to another subscriber premises also have the potential to adversely affect the performance of a MoCA network in the other subscriber premises. The conflict of MoCA signals from the original and other subscriber premises may cause the MoCA interface devices to malfunction or not operate properly.

CATV networks are subject to adverse influences from so-called ingress noise which enters the CATV network from external sources, located at the subscriber premises. The typical range of ingress noise is in the frequency band of 0-15 MHz, but can also exist in other upstream or downstream frequencies. Ingress noise mitigation devices have been developed to suppress or reduce ingress noise from the subscriber premises in the 0-42 MHz frequency band, but the 1125-1525 MHz signals in the MoCA frequency range are considerably outside the range of the normal ingress noise. Therefore, typical ingress noise suppression devices are ineffectual in inhibiting MoCA signals.

MoCA signals, residing outside of the CATV signal frequency bands of 5-42 MHz and 54-1002 MHz, may constitute another source of noise for the CATV network. Separate MoCA frequency rejection filters have been developed for external connection to CATV entry adapters, in an effort to keep the MoCA frequency signals confined to the subscriber premises. However, the use of such devices is subject to unauthorized removal, tampering, negligence in original installation, and physical exposure which could lead to premature failure or malfunction.

Problems also arise because the CATV network and the in-home cable infrastructure were originally intended for the distribution of CATV signals. The typical in-home cable infrastructure uses signal splitters to divide a single CATV downstream signal into multiple CATV downstream signals and to combine multiple CATV upstream signals into a single CATV upstream signal. The CATV entry adapter was not originally intended to communicate MoCA signals between its active ports, as is necessary to achieve MoCA signal communication in the MoCA network. To implement the MoCA network, the MoCA signals must traverse or "jump" between separate signal component legs of a signal splitter/combiner which are connected to the multiple active ports. This signal traversal is referred to as "splitter jumping."

The typical signal splitter has a high degree of signal rejection or isolation between its separate signal component legs. When the MoCA signals jump or traverse between the separate signal component legs of the splitter, the degree of signal rejection or isolation greatly attenuates the strength of the MoCA signals. The physical MoCA signal communication paths are also variable because of unpredictable differences in the in-home cable infrastructure. The MoCA communication protocol recognizes the possibility of variable strength MoCA signals and provides a capability to boost the strength of MoCA signals to compensate for the variable strength of the MoCA signals that would otherwise be communicated between MoCA-enabled devices.

The strength or power of the MoCA signals can be substantially greater than the strength or power of the CATV signals communicated within the subscriber premises. The higher power MoCA signals may result from the MoCA devices compensating for reduced signal strength by boosting the strength or power of the transmitted MoCA signals, or from the simple fact that the MoCA signals traverse a considerably shorter signal path within the subscriber premises MoCA network compared to the considerably longer signal path which CATV downstream signals traverse over the CATV network infrastructure. Consequently, the MoCA signals have the capability of adversely affecting the proper functionality of CATV subscriber equipment.

One example of the significant negative impact from MoCA signals occurs in a CATV entry adapter of the type which has both a passive signal distribution port and multiple active signal distribution ports. Such a CATV entry adapter supplies a passive CATV downstream signal to the passive port and receives a passive CATV upstream signal from the eMTA device connected to the passive port. The CATV entry adapter also supplies active CATV downstream signals to each of its multiple active ports and receives active CATV upstream signals from each of its multiple active ports. Such an entry adapter includes a splitter which divides the CATV downstream signals into passive signals and active signals. The passive signals are conducted through the entry adapter without amplification, conditioning or modification before they are delivered from the passive port to subscriber equipment. The active signals are usually conducted through a forward path amplifier, where the amplifier amplifies the strength of the CATV downstream signals, or modifies or conditions some characteristic of those CATV signals, before delivering them from the active ports to the active subscriber equipment. Most subscriber equipment benefits from amplified CATV downstream signals. The majority of ports on a CATV entry adapter are active ports. Usually only one passive port is provided for each entry adapter.

The subscriber equipment connected to the passive port of the entry adapter is an embedded multimedia terminal adapter (eMTA) device, typically a "lifeline" telephone set. An eMTA device combines a cable modem and analog telephone adapter. The cable modem provides a data interface for communicating Internet protocol packets to and from the CATV network, and an analog telephone adapter provides a voice over Internet protocol (VoIP) interface for the analog telephone set. The eMTA device converts between analog voice signals and packets. A lifeline telephone is a well known example of an eMTA device.

The passive signals conducted through the entry adapter do not undergo amplification, conditioning or modification in the entry adapter before they are delivered from the passive port to passive eMTA subscriber equipment. In general, the passive signals are intended to remain available and useful in emergency conditions. The functionality of a lifeline telephone set can not depend on the proper functionality of an amplifier or other active signal conditioner in the passive signal path. Consequently, the passive CATV downstream signals received by the eMTA lifeline telephone device have relatively low power, compared to the power of the MoCA signals communicated between the MoCA devices connected to the active ports of the entry adapter.

The entry adapter includes an upstream bandpass filter which conducts the CATV upstream signals in the 5-42 MHz frequency band and a downstream bandpass filter which conducts the CATV downstream signals in the 54-1002 MHz frequency band. Although the CATV upstream and downstream bandpass filters are intended to substantially reject signals outside of their bandpass frequencies, the substantially higher power MoCA signals in the 1125-1525 MHz frequency band have the capability of bleeding through typical CATV upstream and downstream bandpass filters with sufficient strength to rival or predominate over the strength of the CATV downstream passive signals delivered from the passive port to the eMTA subscriber equipment. The MoCA signals are noise to the eMTA subscriber equipment, and the eMTA subscriber equipment does not function in response to MoCA signals. However, the strength of the MoCA signals can constitute such a significant noise level as to overwhelm or overdrive the eMTA device and thereby degrade or interfere with its functionality to the point where reliable communication cannot be achieved. It is for this reason that CATV entry adapters which also serve as part of the MoCA network are subject to requirements for MoCA signal isolation or rejection at the passive port compared to the active and entry ports of the entry adapter. At the present time, passive port isolation of approximately 60 dB is considered desirable.

The problem of the power from MoCA signals interfering with the proper functionality of eMTA subscriber equipment connected to the passive port of a CATV entry adapter only occurs with respect to subscriber equipment which is not MoCA-enabled. MoCA-enabled subscriber equipment is intended to operate in response to MoCA signals, and as a result, has the capability of rejecting unwanted MoCA signals when also operating in response to CATV downstream and upstream signals. At the present time, most passive subscriber equipment is not MoCA enabled. Consequently, the problem of the MoCA signals inhibiting the proper functionality of passive subscriber equipment is significant in CATV entry adapters which also conduct MoCA signals in a subscriber premises MoCA network.

An entry adapter for allowing external signals to be conducted between an external network and an internal client network, allowing client signals to be conducted in the internal client network, and blocking the client signals from being conducted from the internal client network to the external network, the entry adapter includes a first port configured to allow external signals to be received by the entry adapter, a second port configured to be connected to a subscriber device, so as to allow the external signals to be conducted to the subscriber device, and a plurality of third ports each configured to allow the client signals to be conducted to the internal client network. The external signals include cable television (CATV) signals having a frequency between 5 MHz and 45 MHz or between 54 MHz and 1002 MHz, and the client signals comprise Multimedia over Coaxial Alliance (MoCA) signals having a frequency between 1125 MHz and 1525 MHz. The entry adapter also includes a first splitter configured to receive the external signals from the first port, a frequency band rejection device configured to receive the external signals from the first splitter and to allow the external signals to proceed from the first splitter to the plurality of third ports, and to block the client signals from proceeding from the third ports, through the frequency band rejection device, and to the first port, and a second splitter configured to receive the external signals from the frequency band rejection device. The second splitter is configured to split the external signals from the frequency band rejection device and distribute the external signals received from the frequency band rejection device to the plurality of third ports. The entry adapter also includes a passive signal path extending from the first splitter to the second port. The passive signal path does not extend through any splitters between the first splitter and the second port, such that a strength of the external signal is not diminished between the first port and the second port to an extent that would interfere with communication between the external network and the subscriber device, and wherein the passive signal path does not include any powered signal conditioning components. The entry adapter further includes an active signal path extending from the first splitter to the frequency band rejection device. The active signal path includes one or more powered signal conditioning components.

An entry adapter for allowing external signals to be conducted between an external network and an internal client network, allowing client signals to be conducted in the internal client network, and blocking the client signals from being conducted from the internal client network to the external network, the entry adapter including a first port configured to allow external signals to be received by the entry adapter, a second port configured to allow the external signals to be conducted to a subscriber device, a plurality of third ports each configured to allow the client signals to be conducted therethrough, a first splitter configured to receive the external signals from the first port, and a frequency band rejection device electrically connected to the first splitter. The frequency band rejection device is configured to allow the external signals to proceed therethrough to the plurality of third ports, and to block the client signals from proceeding therethrough to the first port. The entry adapter also includes a second splitter configured to receive the external signals from the frequency band rejection device, wherein the second splitter is configured to distribute the external signals received from the frequency band rejection device to the plurality of third ports, and a first signal path extending from the first splitter to the second port. The first signal path does not, extend through the second splitter.

An entry adapter for allowing external signals to be conducted between an external. network and an internal client network, allowing client signals to be conducted in the internal client network, and blocking the client signals from being conducted from the internal client network to the external network, the entry adapter including a first port configured to allow external signals to be received by the entry adapter, a second port configured to allow the external signals to be conducted to a subscriber device, a plurality of third ports each configured to allow the client signals to be conducted to the internal client network, a first splitter electrically connected to the first port and the second port. and a frequency band rejection device electrically connected to the first splitter. The frequency band rejection device is configured to allow the external signals to proceed therethrough to the plurality of third ports, and to block the client signals from proceeding therethrough to the first port. The entry adapter also includes a second splitter electrically connected to the frequency band rejection device and the plurality of third ports. The second splitter is configured to distribute the external signals received from the frequency band rejection device to the plurality of third ports. The external signals do not proceed through the second splitter.

DETAILED DESCRIPTION

Figure 1:
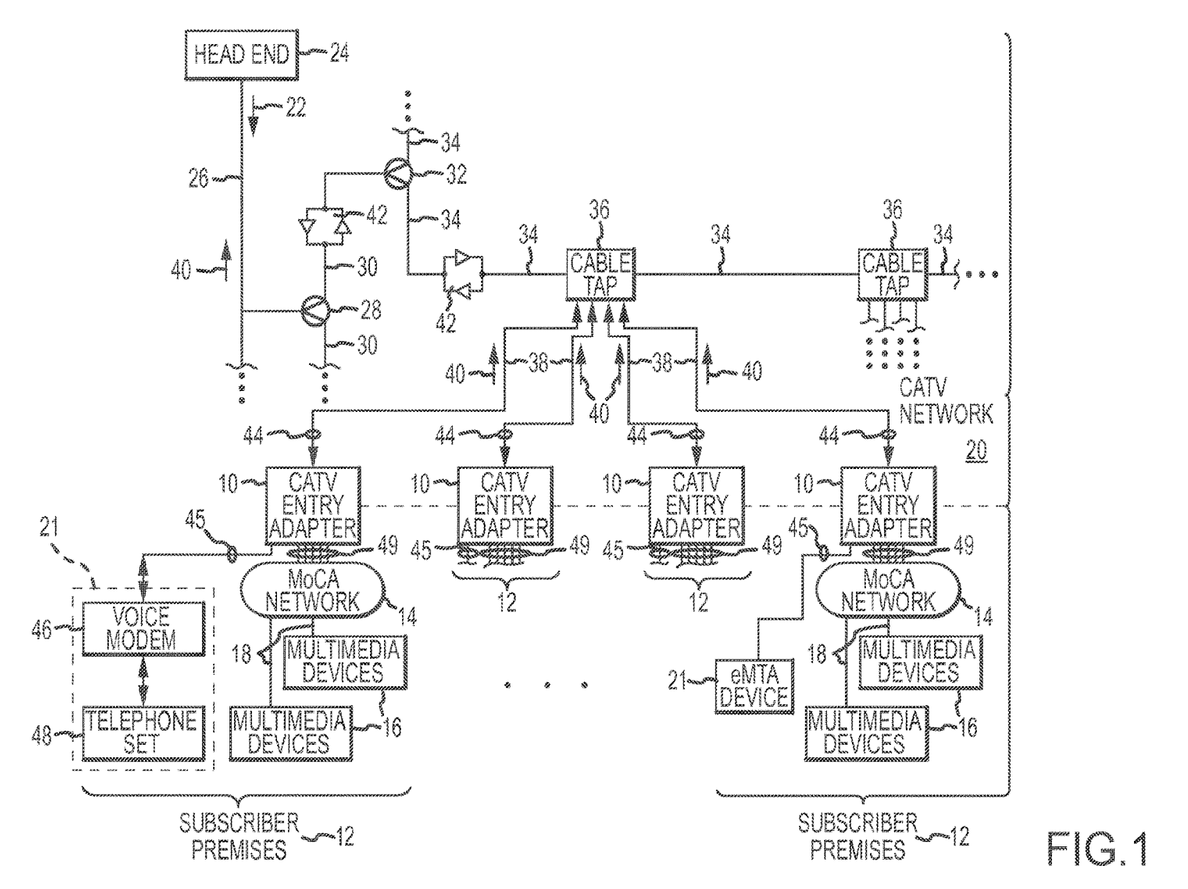
FIG. 1 is a block diagram illustrating a plurality of CATV entry adapters which incorporate the present invention, some of which are shown interconnecting a CATV network and an MoCA in-home network located at subscriber premises.

A community access television or cable television (CATV) entry adapter 10 which incorporates the present invention is shown generally in FIG. 1. The CATV entry adapter 10 is located at or in a CATV subscriber's premises 12 and forms a part of a conventional MoCA in-home entertainment network 14. Multimedia devices 16 are interconnected by the MoCA network 14 in the subscriber premises 12. The multimedia devices 16 communicate multimedia content or MoCA signals between one another using the MoCA network 14. The MoCA network 14 is formed in part by the preexisting coaxial cable infrastructure (represented generally by coaxial cables 18) present in the subscriber premises 12. Examples of multimedia devices 16 are digital video recorders, computers, data modems, computer game playing devices, television sets, television set-top boxes, and other audio and visual entertainment devices. In general, the multimedia devices 16 constitute active subscriber equipment.

The CATV entry adapter 10 is also a part of a conventional CATV network 20. The CATV entry adapter delivers CATV content or signals from the CATV network 20 to subscriber equipment at the subscriber premises 12. In addition to the multimedia devices 16, the subscriber equipment may also include other devices which do not operate as a part of the MoCA network 14 but which are intended to function as a result of connection to the CATV network 20. Examples of subscriber equipment which are normally not part of the MoCA network 14 are eMTA devices 21 which are exemplified by a voice modem 46 and connected telephone set 48.

The CATV entry adapter 10 has beneficial characteristics which allow it to function in multiple roles simultaneously in both the MoCA network 14 and in the CATV network 20, thereby benefiting both the MoCA network 14 and the CATV network 20. The CATV entry adapter 10 functions as a hub in the MoCA network 14, to effectively transfer or distribute MoCA signals between the multimedia devices 16. The CATV entry adapter 10 also functions in a conventional role as an interface between the CATV network 20 and the subscriber equipment located at the subscriber premises, thereby facilitating CATV service to the subscriber. In addition, the CATV entry adapter 10 effectively prevents MoCA signals from the MoCA network 14 from interfering with and degrading the functionality and performance of the eMTA device 21, thereby assuring that the intended functionality of the connected eMTA device will be maintained even though a MoCA network 14 is connected to and interacts with the entry adapter 10. These and other improvements and functions are described in greater detail below.

The CATV network 20 shown in FIG. 1 has a typical topology. Downstream signals 22 originate from programming sources at a headend 24 of the CATV network 20, and are conducted to the CATV entry adapter 10 in a sequential path through a main trunk cable 26, a signal splitter/combiner 28, secondary trunk cables 30, another signal splitter/combiner 32, distribution cable branches 34, cable taps 36, and drop cables 38. Upstream signals 40 are delivered from the CATV entry adapter 10 to the CATV network 20, and are conducted to the headend 24 in a reverse sequence. Interspersed at appropriate locations within the topology of the CATV network 20 are conventional repeater amplifiers 42, which amplify both the downstream signals 22 and the upstream signals 40. Conventional repeater amplifiers may also be included in the cable taps 36. The cable taps 36 and signal splitter/combiners 28 and 32 divide a single downstream signal into multiple separate downstream signals, and combine multiple upstream signals into a single upstream signal.

The CATV entry adapter 10 receives the downstream signals 22 from the CATV network 20 at a CATV network connection or entry port 44. Passive downstream signals are conducted through the CATV entry adapter 10 to the eMTA device 21 without amplification, enhancement, modification or other substantial conditioning. Passive downstream signals are delivered from a passive port 45 to passive subscriber equipment, i.e. the eMTA device 21 represented by the voice modem 46 connected to the telephone set 48. Active downstream signals are amplified, filtered, modified, enhanced or otherwise conditioned by power-consuming active electronic circuit components within the CATV entry adapter 10, such as an amplifier, for example. The active downstream signals are divided into multiple copies, and a copy is delivered from each of a plurality of active ports, collectively referenced at 49 (but individually referenced at 50, 52, 54 and 56 in FIG. 2). The active downstream signals are delivered to active subscriber equipment located at the subscriber premises 12.

Typically, the active subscriber equipment will be the multimedia devices 16 connected as part of the MoCA network 14. However, an active subscriber device does not have to be MoCA-enabled. An example of a non-MoCA-enabled active subscriber device is a television set directly connected to an active port of the CATV entry adapter without the use of a MoCA interface. In this example, the non-MoCA-enabled television set would not be a part of the MoCA network 14.

The CATV subscriber equipment typically generates upstream signals 40 (FIG. 2) and delivers them to the CATV entry adapter 10 for delivery to the CATV network 20. The upstream signals 40 may be passive upstream signals generated by the eMTA device 21, or the upstream signals 40 may be active upstream signals generated by active subscriber equipment or multimedia devices 16, as exemplified by set-top boxes connected to television sets (neither shown). Set top boxes allow the subscriber/viewer to make programming and viewing selections.

Figure 2:
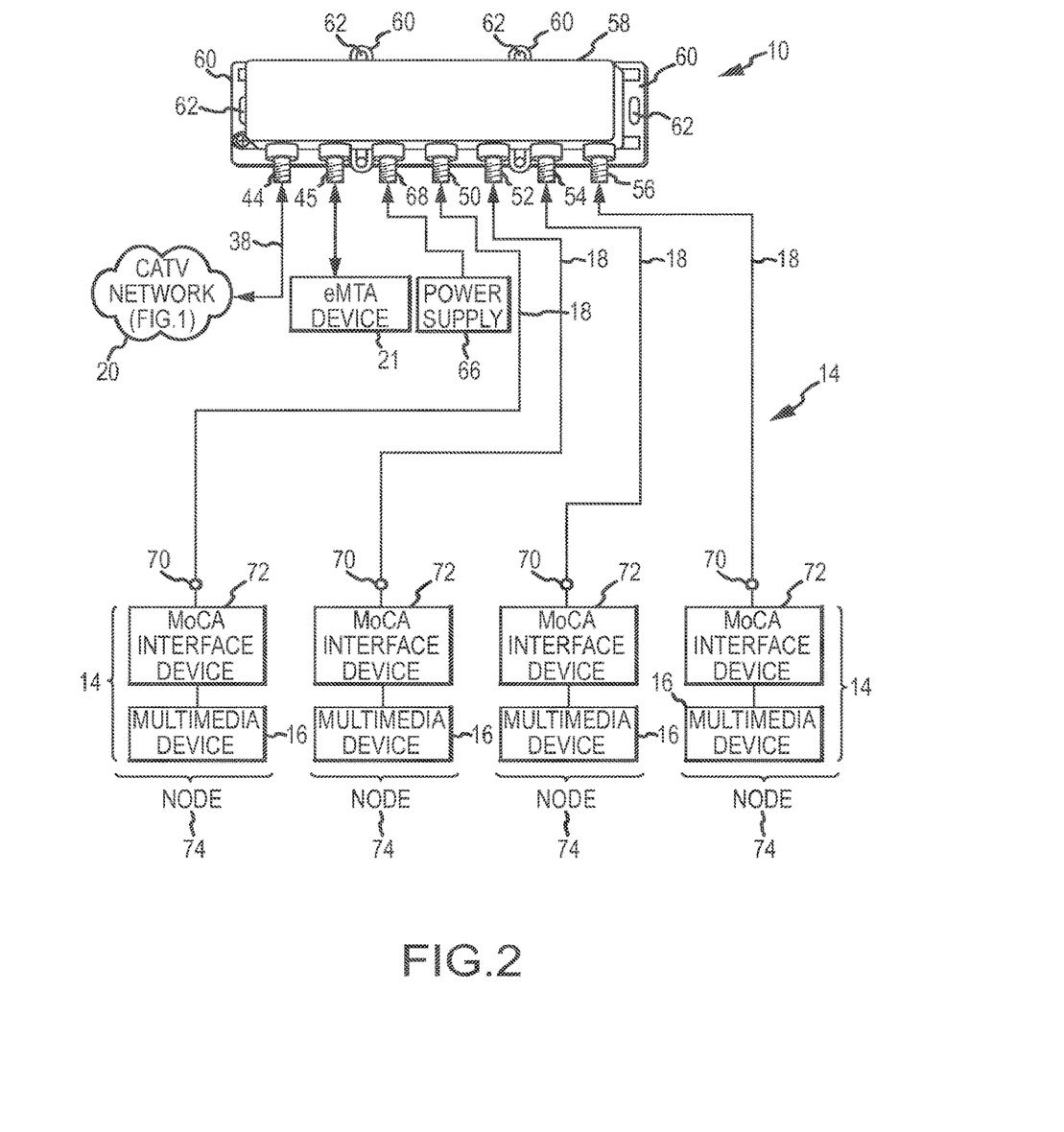
FIG. 2 is a generalized perspective view of one CATV entry adapter shown in FIG. 1 in a subscriber premises, connected to the MoCA network and to active and passive subscriber equipment shown in block diagram form.

More details concerning the CATV entry device are shown in FIG. 2. The CATV entry adapter 10 includes a housing 58 which encloses internal electronic circuit components (shown in FIG. 3). A mounting flange 60 surrounds the housing 58 and holes 62 in the flange 60 allow attachment of the CATV entry adapter 10 to a support structure at the subscriber premises. Electrical power for the active components of the CATV entry adapter 10 is supplied from a conventional DC power supply 66 connected to a dedicated power input port 68. Alternatively, electrical power can be supplied through a conventional power inserter (not shown) that is connected to one of the active ports 50, 52, 54 or 56. The power inserter allows relatively low voltage DC power to be conducted through the same active port that also conducts high-frequency signals. Use of a conventional power inserter eliminates the need for a separate dedicated power supply port 68, or provides an alternative port through which electrical power can also be applied. The power supply 66 or the power supplied from the power inserter is typically derived from a conventional wall outlet (not shown) within the subscriber premises. The CATV network 20 is connected to the CATV network connection entry port 44 of the CATV entry adapter 10.

The ports 44, 45, 50, 52, 54, 56 and 68 are each preferably formed by a conventional female coaxial cable connector which is mechanically connected to the housing 58 and which is electrically connected to internal components of the CATV entry adapter 10. Coaxial cables 18 from the subscriber premises cable infrastructure and the drop cables 38 (FIG. 1) are connected to the CATV entry adapter 10 by mechanically connecting the corresponding mating male coaxial cable connectors (not shown) on these coaxial cables to the female coaxial cable connectors forming the ports 44, 45, 50, 52, 54, 56 and 68.

One CATV entry adapter 10 is located at each subscriber premises. The number of active and passive ports 45, 50, 52, 54 and 56 is dictated by the number of coaxial cables 18 which are routed throughout the subscriber premises. Although the CATV entry adapter 10 shown in FIG. 2 includes seven ports, other entry adapters may have a larger or smaller number of ports. The number and routing of the coaxial cables 18 within the subscriber premises constitute the in-home or subscriber premise cable infrastructure that is used by the MoCA network 14 (FIG. 1).

Since the CATV service provider provides the CATV entry adapter 10 for use by each CATV subscriber, it is advantageous to reduce the number of different configurations of CATV entry adapters that subscribers may require. Doing so offers economies of scale in mass production, reduces the opportunity for errors in installation, allows the subscriber to expand and change the in-home cable infrastructure, and reduces inventory costs, among other things. Incorporating functionality in the CATV entry adapter 10 to give it the capability of functioning as a hub in the MoCA network 14 (FIG. 1) also promotes economies of scale, error reduction, expansion capability, versatility and reduction in inventory cost. With the improvements described below, the CATV entry adapter 10 permits the effective use of both eMTA devices 21 and multimedia devices 16 connected in a MoCA network 14, without degrading or compromising the intended functionality of a connected eMTA device 21.

Each of the coaxial cables 18 of the in-home cable infrastructure terminates at a cable outlet 70. Those coaxial cables 18 which are not currently in use are preferably terminated with an appropriate termination resistor (not shown) located at the cable outlet 70 of these coaxial cables 18. In most cases however, the cable outlet 70 of the coaxial cable 72 is connected to a MoCA interface device 72 to which a separate multimedia device 16 is connected.

Each MoCA interface device 72 is conventional and contains a controller (not shown) which is programmed with the necessary functionality to implement the MoCA communication protocol. Each MoCA interface device 72 is connected between the cable outlet 70 and a multimedia device 16. When the multimedia device 16 creates output signals, those output signals are encapsulated or otherwise embodied in MoCA signals created by the MoCA interface device 72, and then those MoCA signals are transmitted by one MoCA interface device 72 through the coaxial cables 18 of the in-home cable infrastructure, through the CATV entry adapter 10 acting as a MoCA network hub, and to another receiving MoCA interface device 72 in the MoCA network 14 at the subscriber premises. The receiving MoCA interface device 72 extracts the original output signals that were originally encapsulated or otherwise embodied in the MoCA signals, and the receiving MoCA interface device 72 supplies those original output signals to the multimedia device 16 to which the receiving MoCA interface device 72 is attached. The receiving MoCA interface device 72 may send administrative signals back to the original transmitting MoCA interface device 72 to confirm receipt of the MoCA signals and otherwise provide information, such as signal strength. In this manner, MoCA signals which contain the multimedia content from one multimedia device 16 are communicated through the MoCA network 14 (FIG. 1) to another MoCA-enabled multimedia device 16 for use at its location. Functioning in this manner, and in terms of the conventional terminology used in the field of networks, the MoCA interface device 72 and the multimedia device 16 form one node 74 of the MoCA network 14. MoCA signals are communicated in the described manner between the different MoCA nodes 74 of the MoCA network 14.

Although the MoCA interface device is 72 are shown as separate from the multimedia devices 16, each MoCA interface device 72 is typically incorporated within or as an integral part of each MoCA-enabled multimedia device 16. However, for those multimedia devices 16 which do not include a built-in MoCA interface device 72, a separate MoCA-enabled device 72 is connected to the multimedia device 16 to thereby allow it to participate as a node in the MoCA network 14.

Figure 3:
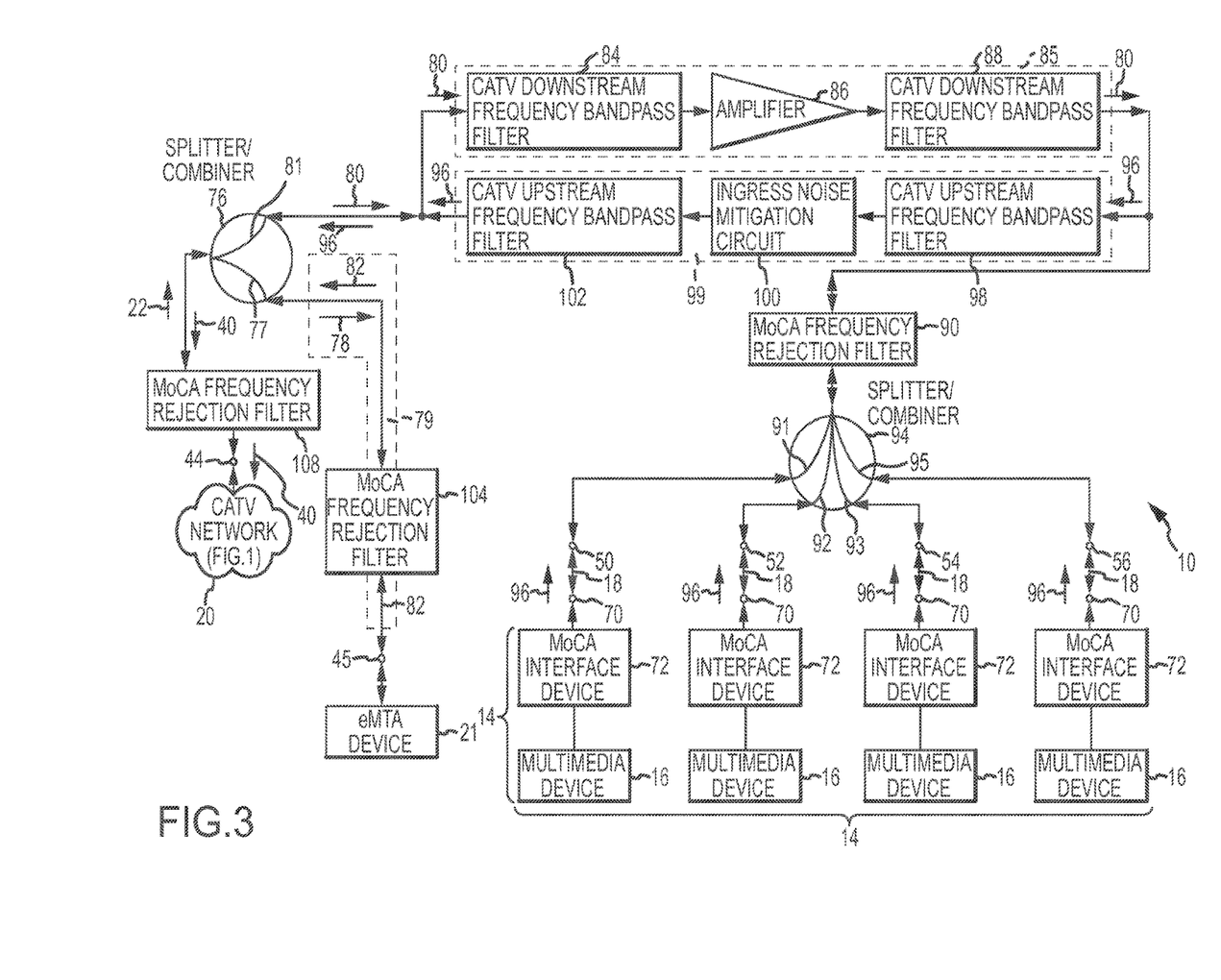
FIG. 3 is a block diagram of functional components of the CATV entry adapter shown in FIG. 2, shown connected to the CATV network, to the passive subscriber equipment, and to active subscriber equipment forming nodes of the MoCA network.

The internal functional components of the CATV entry adapter 10 are shown in FIG. 3. Those internal circuit components include a first conventional bi-directional signal splitter/combiner 76 which splits the downstream signals 22 from the CATV network 20 received at a common terminal from the entry port 44. The downstream signals 22 are split into passive CATV downstream signals 78 at one separate signal component leg 77 and into active CATV downstream signals 80 at another separate signal component leg 81.

The passive downstream signals 78 are conducted in a passive signal communication path 79 directly to and through the passive port 45 to the eMTA device 21. Passive upstream signals 82 are created by the eMTA device 21 and are conducted through the passive port 45 through the passive signal communication path 79 to the signal splitter/combiner 76 to become upstream signals 40 in the CATV network 20. The passive signal communication path 79 for the passive signals in the CATV entry adapter 10 contains no power-consuming active electronic components that might fail or malfunction, thereby enhancing the reliability of CATV passive communications. The passive signal communication path 79 is intended to be as reliable as possible since it is used in emergency and critical circumstances. A "lifeline" telephone communication capability established by the voice modem 46 and telephone set 48 (FIG. 1) is one example of an eMTA device 21.

The active CATV downstream signals 80 from the other separate signal component leg 81 of the splitter/combiner 76 are conducted to a first CATV downstream frequency bandpass filter 84 in an active downstream signal communication path 85. The downstream filter 84 passes signals having frequencies in the CATV downstream frequency range of 54-1002 MHz, and rejects signals having frequencies in other ranges. The downstream signals passed by the filter 84 are amplified by an amplifier 86 and then supplied to a second CATV downstream frequency bandpass filter 88, both of which are also part of the active downstream signal communication path 85.

The amplified and further filtered active CATV downstream signals are then conducted to a MoCA frequency rejection filter 90 having a conventional construction. The function of the MoCA frequency rejection filter 90 is to reject signals in the MoCA frequency range of 1125-1525 MHz by not conducting those signals through the filter 90. Signals in frequency ranges outside of the MoCA frequency band of 1125-1525 MHz are passed through the MoCA frequency rejection filter 90. The CATV downstream signals are in the 54-1002 MHz frequency range, so the MoCA frequency rejection filter 90 readily passes the CATV downstream signals.

After passing through the MoCA frequency rejection filter 90, the CATV downstream signals in the frequency range of 54-1002 MHz are applied to a common terminal of a second conventional bidirectional splitter/combiner 94. The splitter/combiner 94 splits or divides those signals into four identical downstream signals, each of which has approximately one-fourth of the power or signal strength of the downstream signal initially applied to the splitter/combiner 94. Each of the split signals is delivered from one of four separate signal component legs 91, 92, 93 and 95 of the splitter/combiner 94. The four split signals from the signal component legs 91, 92, 93 and 95 of the splitter/combiner 94 are applied at the active ports 50, 52, 54 and 56 of the CATV entry adapter 10, respectively. Although four active ports 50, 52, 54 and 56 are shown, more active ports are achieved by use of a splitter/combiner with a different number of signal component legs, or by use of multiple cascaded splitters/combiners, to derive the desired number of split signals to be applied to all of the active ports of the entry adapter 10.

To the extent that the multimedia devices 16 connected through the coaxial cables 18 to the active ports respond to the CATV downstream signals available at the active ports 50, 52, 54 and 56, each MoCA interface device 72 passes those downstream signals directly to the multimedia device 16. The MoCA interface device 72 does not modify or otherwise influence CATV downstream signals passing through it. In those cases where the multimedia device 16 is capable of sending CATV upstream signals 96, those CATV upstream signals 96 are likewise passed through the MoCA interface device 72 without change or influence and are then conducted through the cable outlet 70, the coaxial cable 18 and the active ports 50, 52, 54 or 56 to the splitter/combiner 94. The splitter/combiner 94 combines all CATV upstream signals 96 and supplies those signals as combined active upstream signals 96 to the MoCA frequency rejection filter 90. Since the CATV upstream signals 96 are within the frequency band of 5-42 MHz and are outside of the 1125-1525 MHz MoCA frequency band, the CATV upstream signals 96 are passed upstream by MoCA frequency rejection filter 90 into an active signal communication path 99.

The combined active upstream signals 96 from the MoCA frequency rejection filter 90 are supplied to a first CATV upstream frequency bandpass filter 98 of the active upstream signal communication path 99. The filter 98 passes signals having frequencies in the CATV upstream frequency range of 5-42 MHz, and rejects signals having frequencies in other ranges. The CATV upstream signals passed by the filter 96 are then supplied to an ingress noise mitigation circuit 100. The ingress noise mitigation circuit 100 suppresses ingress noise in the range of 0-42 MHz that may have originated from noise sources within the subscriber premises. Use of the ingress noise mitigation circuit 100 is optional in the CATV entry adapter 10, but if employed, the noise mitigation circuit 100 is preferably employed in the form described in U.S. patent application Ser. No. 12/250,227, filed Oct. 13, 2008, and titled Ingress Noise Inhibiting Network Interface Device and Method for Cable Television Networks, which is assigned to the assignee hereof.

The CATV upstream signals leaving the ingress noise mitigation circuit 100 are then applied to a second CATV upstream frequency bandpass filter 102. The second CATV upstream frequency bandpass filter 102 is also optional for use. The second upstream bandpass filter 102 may not be necessary if the first upstream bandpass filter 98 provides sufficient frequency filtering characteristics and the ingress noise mitigation circuit 100 is not used. The second upstream bandpass filter 102 may also be eliminated under certain circumstances, even when the ingress noise mitigation circuit 100 is used. The ingress noise mitigation circuit 100 and the second CATV upstream bandpass filter 102 are also part of the active upstream signal communication path 99.

The active upstream signals from the active upstream signal communication path 99 are supplied to the signal component leg 81 of the splitter/combiner 76. The passive upstream signals 82 from the passive signal communication path 79 are supplied to the signal component leg 77 of the splitter/combiner 76. The splitter/combiner 76 combines the signals supplied to its signal component legs and 77 and 81 to form a single combined upstream signal 40.

The MoCA network 14 exists between and through the active ports 50, 52, 54 and 56, as is shown in FIG. 3. Ideally, the MoCA signals in the MoCA network 14 should be confined to paths between the MoCA interface devices 72 through the cable outlets 70, the coaxial cables 18, the active ports 50, 52, 54 and 56, and the splitter/combiner 94. When the MoCA frequency rejection filter 90 has sufficient size and capacity to effectively suppress and reject substantially all of the power or strength of the MoCA signals present at the common terminal of the splitter/combiner 94, the MoCA signals will be confined in this ideal manner. However, a MoCA frequency rejection filter 90 which has the capability to effectively suppress and reject substantially all the power of the MoCA signals is relatively costly, will require a large number of components to fabricate thereby making its manufacture more difficult and expensive, and will require substantially greater manufacturing effort to tune to achieve effective MoCA frequency rejection in connection with establishing the bandpass characteristics of the CATV downstream and upstream filters 84, 88, 98, and 102. The interrelated nature of the filters 90, 84, 88, 98 and 102 in the single entry adapter 10 makes the proper operation of each filter depend on the proper operation of all of the other filters. Tuning all of the filters therefore becomes an expensive, repetitive, and time-consuming iterative activity.

In general, without substantial suppression of the MoCA signals by the MoCA frequency rejection filter 90, MoCA signals having enough strength to adversely influence the proper functionality of the eMTA device 21 may bleed or otherwise propagate through the circuitry of the active communication paths 85 and 99 and interact with the passive CATV upstream and downstream signals 82 and 78 in the passive communication path 79. The strength of the MoCA signals which propagate in this manner may be sufficient to corrupt the information contained in the passive CATV signals 78 and 82, and thereby compromise or prevent the proper functionality of the eMTA device 21. The strength of the MoCA signals which propagate in this manner may also be sufficient to overwhelm certain transmitters and receivers within the eMTA device 21, which will also compromise or prevent its proper functionality.

If only a single MoCA frequency rejection filter 90 is utilized in the entry adapter 10, that single MoCA frequency rejection filter 90 must have the singular capacity of rejecting or isolating the MoCA signals from the CATV signals within the entry adapter 10 and confining the MoCA signals to the MoCA network 14. At the present time, it is expected that approximately 60 dB will be the required minimum isolation capacity to prevent the MoCA frequency signals from adversely influencing the proper functionality of the eMTA device 21. Manufacturing a single MoCA frequency rejection filter having a 60 dB isolation capacity is complex, expensive and time-consuming. A relatively large number of component parts are required to create a rejection filter of this capacity. The components must be assembled and then tuned under circumstances where tuning the MoCA frequency rejection filter will usually be influenced by the tuning of the CATV bandpass filters 84, 88, 98 and 102.

To avoid the cost and complexity of manufacturing and tuning a single MoCA frequency rejection filter 90 having sufficient capacity to reject all MoCA signals and prevent them from entering the signal communication paths 85 and 99 of the entry adapter, one or more additional MoCA frequency rejection filters 104 and 108 is incorporated in the entry adapter 10. In this circumstance, the MoCA frequency rejection filter 90 is not required to reject the entire strength of the MoCA signals, but instead has a capacity which is sufficient to reject the substantial majority of the strength of the MoCA signals. The remaining portion of the MoCA signal strength is rejected by one or both of the additional MoCA frequency rejection filters 104 and 108.

The second MoCA frequency rejection filter 104 is connected in the passive communication path 79. The second MoCA frequency rejection filter 104 rejects the residual MoCA signals that pass through the first MoCA frequency rejection filter 90 into the active downstream and upstream communication paths 85 and 99. Residual MoCA signals are therefore prevented from interacting with the eMTA device 21 due to the MoCA frequency rejection capability of the second MoCA frequency rejection filter 104. The second MoCA frequency rejection filter 104 does not influence the passive downstream signals supplied to the eMTA device 21 or the passive upstream signal supplied from the eMTA device, because the rejection capability of the second rejection filter 104 applies only to signals in the 1125-1525 MHz range and the CATV passive downstream and upstream signals occupy entirely different frequency ranges of 5-42 MHz and 52-1002 MHz.

The third MoCA frequency rejection filter 108 is connected between the common terminal of the splitter/combiner 76 and the CATV network entry port 44. The third MoCA frequency rejection filter 108 rejects the residual MoCA signals which have bled through the first MoCA frequency rejection filter 90, the active signal communication paths 85 and 99 and the splitter/combiner 76, thereby preventing those residual MoCA signals from reaching the CATV network 20. Without the MoCA rejection filter 108, as understood from FIG. 1, the residual MoCA signals from one CATV entry adapter 10 could traverse the drop cables 38 to the cable tap 36, and from the cable tap through another drop cable 38 of that cable tap 36 to another CATV entry adapter 10 of a different CATV subscriber. Preventing the residual MoCA signals from reaching an adjacent subscriber premises is important in securing the privacy of the communications within the MoCA network 14 of the original CATV subscriber and from preventing interference with the proper functionality of the MoCA network of a different CATV subscriber. From a similar perspective, the third MoCA rejection filter 108 also prevents residual MoCA signals present on the CATV network 20 from the MoCA network of another CATV subscriber from entering the CATV entry adapter 10 at the entry port 44 and contributing to problems with proper passive signal communication to and from the eMTA device 21. Thus, the third MoCA frequency rejection filter 108 prevents MoCA signals from escaping from the entry adapter 10 to the CATV network 20 and prevents MoCA signals present on the CATV network 20 from entering the entry adapter 10.

By dividing the MoCA frequency rejection functionality among multiple MoCA frequency rejection filters 90, 104 and 108, each of the MoCA frequency rejection filters can have a smaller capacity. The smaller capacity makes the MoCA frequency rejection filters less costly and complex to manufacture. The reduced rejection capacity does not involve as much interaction with the CATV bandpass filters, thereby reducing the difficulty of tuning the smaller capacity filters. Smaller capacity MoCA frequency rejection filters require fewer components and less manufacturing effort. In general, dividing the MoCA frequency rejection functionality among multiple MoCA frequency rejection filters simplifies the manufacturing and achieves equal or better MoCA frequency rejection performance than that obtained by a more complex single MoCA rejection filter 90.

Preferably, the combination of MoCA frequency rejection filters achieves at least 60 dB of isolation between the passive port 45 and any one of the active ports 50, 52, 54 and 56 and the entry port 44. This degree of isolation is achieved by sizing the MoCA frequency rejection filters 90, 104 and 108 to achieve the desired 60 dB of signal isolation. The preferred approach is to size each of the three MoCA frequency rejection filters 90, 104 and 108 to have at least 30 dB of isolation individually, because the effect of multiple filters is additive.

In addition to the benefits of rejecting the MoCA signals in the CATV signal paths, the MoCA frequency rejection filter 90 also contributes to the strength of the MoCA signals communicated in the MoCA network 14. The rejection capability of the MoCA frequency rejection filter 90 is achieved in part by reflecting MoCA signals, rather than by absorbing the power or strength of the MoCA signals. The MoCA signals reflected from the MoCA frequency rejection filter 90 pass directly downstream through the splitter/combiner 94. Although the strength of the reflected MoCA signals is divided by the splitter/combiner 94, the strength of the split reflected MoCA signals at the signal component legs 91, 92, 93 and 95 adds to the strength of the MoCA signals present at the signal component legs 91, 92, 93 and 95. Without the additive effect from the split reflected MoCA signals, the strength of the MoCA signals available at the signal component legs 91, 92, 93 and 95 depends entirely upon splitter jumping. As discussed above, splitter jumping involves a substantial signal attenuation, thus substantially reducing the MoCA signal strength at the ports 50, 52, 54 and 56. By adding the effect of the split MoCA signals reflected from the MoCA frequency rejection filter 90, the MoCA signals available from the signal component legs 91, 92, 93 and 95 to be communicated to the MoCA interface devices 72 is substantially enhanced by the signal reflection characteristics of the MoCA frequency rejection filter 90.

The enhanced signal strength of the MoCA signals created by the reflections from the MoCA frequency rejection filter 90 also contributes to reducing the strength of the MoCA signals which bleed through the MoCA frequency rejection filter 90. As discussed above, the MoCA communication protocol has a capability of communicating information describing the received signal strength between the transmitting and receiving MoCA interface devices. A low signal strength will result in the transmitting MoCA interface device increasing the strength of the transmitted signal. Without the additive effect from the split reflected MoCA signals at the signal component legs 91, 92, 93 and 95, the signal strength received by the receiving MoCA interface device would be substantially attenuated because of the splitter jumping of the MoCA signal between the signal component legs of the splitter/combiner 94. The diminished signal strength would be communicated to the transmitting MoCA interface device, and the transmitting MoCA interface device would respond by increasing the strength of the transmitted MoCA signals. The increased strength of the transmitted MoCA signals would not be as effectively rejected by the MoCA frequency rejection filter 90, thereby permitting more residual MoCA signal strength to bleed through into the CATV signal communication paths of the entry adapter. However, by enhancing the MoCA signal strength at the signal component legs 91, 92, 93 and 95 due to the additive effect of the MoCA signals reflected from the MoCA frequency rejection filter 90, the signal strength of the transmitted MoCA signals is lower, resulting in less MoCA signal bleed-through and less required MoCA signal rejection to obtain proper functionality of the eMTA device 21.

The second MoCA frequency rejection filter 104 is important when the third MoCA frequency rejection filter 108 is connected to the CATV entry port 44 of the CATV entry adapter 10. Some portion of the residual bleed-through MoCA signals is reflected from the third MoCA frequency rejection filter 108, and those rejected residual MoCA signals pass through the splitter/combiner 76 to the passive communication path 79. Consequently, including the third MoCA frequency rejection filter 108 at the CATV entry port 44 enhances the strength or power of the residual MoCA frequencies conducted into the passive communication path 79 due to signal reflection.

The CATV entry adapter 10 beneficially contributes to the quality of service available from the CATV network 20 and from the MoCA network 14. The proper functionality of an eMTA device 21 at the subscriber premises is sustained even when the eMTA device 21 is not MoCA-enabled and a MoCA network is established with the entry adapter 21. The MoCA frequency rejection filter(s) suppress(es) those residual MoCA signals which bleed from the MoCA network into the passive CATV signal communication path, thereby preserving the intended functionality of lifeline or another eMTA device connected to the entry adapter 10. The CATV entry adapter 10 is fully functional as a MoCA network hub to communicate adequate strength MoCA signals between all MoCA interface devices and multimedia devices, while simultaneously preserving the intended CATV functionality. The CATV entry adapter also prevents or greatly inhibits MoCA signals from reaching the CATV network, thereby avoiding a compromise in the privacy and security of the MoCA content which is expected to be maintained only within the MoCA network of the subscriber premises. Similarly, the CATV entry adapter also prevents or greatly inhibits MoCA signals present on the CATV network 20 from entering the adapter and interfering with the proper functionality of the subscriber equipment connected to the entry adapter. The advantageous functionality of the CATV entry adapter is obtained within the housing of the CATV entry adapter, thereby shielding that desirable functionality from unauthorized tampering, negligence in installation, and physical exposure. The multi-functional aspects of the CATV entry adapter allow it to be used in many situations, thereby increasing its economies of scale and use and facilitating greater convenience in installation by the CATV service provider. The CATV entry adapter 10 allows subscribers more flexibility in expanding and changing both their CATV subscriber equipment and their MoCA network and multimedia devices.

The significance of these and other improvements and advantages will become apparent upon gaining a full appreciation of the present invention. Preferred embodiments of the invention and many of its improvements have been described above with a degree of particularity. The detailed description is of preferred examples of implementing the invention. The details of the description are not necessarily intended to limit the scope of the invention. The scope of the invention is defined by the following claims.

We claim:

1. An entry adapter for allowing external signals to be conducted between an external network and an internal client network, allowing client signals to be conducted in the internal client network, and blocking the client signals from being conducted from the internal client network to the external network, the entry adapter comprising:

a first port configured to allow external signals to be received by the entry adapter;

a second port configured to be connected to a subscriber device, so as to allow the external signals to be conducted to the subscriber device;

a plurality of third ports each configured to allow the client signals to be conducted to the internal client network, wherein the external signals comprise cable television (CATV) signals having a frequency between 5 MHz and 45 MHz or between 54 MHz and 1002 MHz, and the client signals comprise Multimedia over Coaxial Alliance (MoCA) signals having a frequency between 1125 MHz and 1525 MHz;

a first splitter configured to receive the external signals from the first port;

a frequency band rejection device configured to receive the external signals from the first splitter and to allow the external signals to proceed from the first splitter to the plurality of third ports, and to block the client signals from proceeding from the plurality of third ports, through the frequency band rejection device, and to the first port;

a second frequency band rejection device electrically connected to the first port, wherein the second frequency band rejection device is configured to block the client signals from being communicated to the external network;

a second splitter configured to receive the external signals from the frequency band rejection device, wherein the second splitter is configured to split the external signals from the frequency band rejection device and distribute the external signals received from the frequency band rejection device to the plurality of third ports; and a passive signal path extending from the first splitter to the second port, wherein the passive signal path does not extend through any splitters between the first splitter and the second port, such that a strength of the external signal is not diminished between the first port and the second port to an extent that would interfere with communication between the external network and the subscriber device, and wherein the passive signal path does not include any powered signal conditioning components; and an active signal path extending from the first splitter to the frequency band rejection device, wherein the active signal path includes one or more powered signal conditioning components.

2. The entry adapter of claim 1, wherein the frequency band rejection device is configured to selectively block or allow signals based on frequencies of the signals.

3. The entry adapter of claim 1, wherein the client signals communicated between the plurality of third ports are blocked from communicating with the active signal path.

4. The entry adapter of claim 1, wherein the client signals communicated between the plurality of third ports are blocked from communicating with the first splitter.

5. The entry adapter of claim 1, wherein the second splitter comprises a four-way splitter.

6. The entry adapter of claim 1, wherein the second splitter comprises two or more two-way splitters.

7. The entry adapter of claim 1, wherein the frequency band rejection device is configured to block the client signals from proceeding therethrough to the first port by at least partially reflecting the client signals communicated from any of the plurality of third ports back towards one or more of the plurality of third ports.

8. The entry adapter of claim 1, wherein the frequency band rejection device is configured to block the client signals from proceeding therethrough to the first port by attenuating the client signals communicated from any of the plurality of third ports toward the first port.

9. The entry adapter of claim 1, wherein the frequency band rejection device is configured to configured to allow the external signals to proceed therethrough bidirectionally between the first port and the plurality of third ports by passing the external signals without significant attenuation.

10. An entry adapter for allowing external signals to be conducted between an external network and an internal client network, allowing client signals to be conducted in the internal client network, and blocking the client signals from being conducted from the internal client network to the external network, the entry adapter comprising:

a first port configured to allow external signals to be received by the entry adapter;

a second port configured to allow the external signals to be conducted to a subscriber device;

a plurality of third ports each configured to allow the client signals to be conducted therethrough;

a first splitter configured to receive the external signals from the first port;

a frequency band rejection device electrically connected to the first splitter wherein the frequency band rejection device is configured to allow the external signals to proceed therethrough to the plurality of third ports, and to block the client signals from proceeding therethrough to the first port;

a second frequency band rejection device electrically connected to the first port, wherein the second frequency band rejection device is configured to block the client signals from being communicated to the external network;

a second splitter configured to receive the external signals from the frequency band rejection device, wherein the second splitter is configured to distribute the external signals received from the frequency band rejection device to the plurality of third ports; and a first signal path extending from the first splitter to the second port, wherein the first signal path does not extend through the second splitter.

11. The entry adapter of claim 10, wherein a strength of the external signal is not diminished between the first port and the second port to an extent that would interfere with communication between the external network and the subscriber device.

12. The entry adapter of claim 10, wherein the first signal path does not extend through any splitter between the first splitter and the second port.

13. The entry adapter of claim 10, further comprising a second signal path extending from the first splitter to the frequency band rejection device.

14. The entry adapter of claim 13, wherein the first signal path is a passive signal path, and the second signal path is an active signal path.

15. The entry adapter of claim 13, wherein the first signal path lacks powered signal conditioning components, and wherein the second signal path includes one or more powered signal conditioning components.

16. The entry adapter of claim 13, wherein the client signals communicated between the plurality of third ports are blocked from communicating with the second signal path.

17. The entry adapter of claim 10, wherein the external signals have a frequency that is between 5 MHz and 45 MHz or between 54 MHz and 1005 MHz, and the client signals have a frequency between 1125 MHz and 1525 MHz, and wherein the frequency band rejection device is configured to selectively block or allow signals based on the frequencies of the signals.

18. The entry adapter of claim 10, wherein the client signals communicated between the plurality of third ports are blocked from communicating with the first splitter.

19. The entry adapter of claim 10, wherein the second splitter comprises a four-way splitter.

20. The entry adapter of claim 10, wherein the second splitter comprises two or more two-way splitters.

21. The entry adapter of claim 10, wherein the frequency band rejection device is configured to block the client signals from proceeding therethrough to the first port by at least partially reflecting the client signals communicated from any of the plurality of third ports towards the first port back towards one or more of the plurality of third ports.

22. The entry adapter of claim 10, wherein the frequency band rejection device is configured to block the client signals from proceeding therethrough to the first port by attenuating the client signals communicated from any of the plurality of third ports to the first port.

23. The entry adapter of claim 10, wherein the frequency band rejection device is configured allow the external signals to proceed therethrough bidirectionally between the first port and the plurality of third ports by passing the external signals without significant attenuation.

24. An entry adapter for allowing external signals to be conducted between an external network and an internal client network, allowing client signals to be conducted in the internal client network, and blocking the client signals from being conducted from the internal client network to the external network, the entry adapter comprising:
   a first port configured to allow external signals to be received by the entry adapter;
   a second port configured to allow the external signals to be conducted to a subscriber device;
   a plurality of third ports each configured to allow the client signals to be conducted to the internal client network;
   a first splitter electrically connected to the first port and the second port;
   a frequency band rejection device electrically connected to the first splitter, wherein the frequency band rejection device is configured to allow the external signals to proceed therethrough to the plurality of third ports, and to block the client signals from proceeding therethrough to the first port;
   a second frequency band rejection device electrically connected to the first port, wherein the second frequency band rejection device is configured to block the client signals from being communicated to the external network; and
   a second splitter electrically connected to the frequency band rejection device and the plurality of third ports, wherein the second splitter is configured to distribute the external signals received from the frequency band rejection device to the plurality of third ports, wherein the external signals do not proceed through the second splitter between the first splitter and the second port.

25. The entry adapter of claim 24, wherein the external signals do not proceed through any splitter between the first splitter and the second port.

26. The entry adapter of claim 25, wherein a strength of the external signals is not diminished between the first port and the second port to an extent that would interfere with communication between the external network and the subscriber device.

27. The entry adapter of claim 24, further comprising a first signal path extending from the first splitter to the second port, wherein the first signal path does not extend through the second splitter.

28. The entry adapter of claim 27, further comprising a second signal path extending from the first splitter to the frequency band rejection device.

29. The entry adapter of claim 28, wherein the first signal path is a passive signal path, and the second signal path is an active signal path.

30. The entry adapter of claim 28, wherein the first signal path lacks powered signal conditioning components, and wherein the second signal path includes one or more powered signal conditioning components.

31. The entry adapter of claim 28, wherein the client signals communicated between the plurality of third ports are blocked from communicating with the second signal path.

32. The entry adapter of claim 24, wherein the external signals have a frequency that is between 5 MHz and 45 MHz or between 54 MHz and 1005 MHz, and the client signals have a frequency between 1125 MHz and 1525 MHz, and wherein the frequency band rejection device is configured to selectively block or allow signals based on the frequencies of the signals.

33. The entry adapter of claim 24, wherein the client signals communicated between the plurality of third ports are blocked from communicating with the first splitter.

34. The entry adapter of claim 24, wherein the second splitter comprises a four-way splitter.

35. The entry adapter of claim 24, wherein the second splitter comprises two or more two-way splitters.

36. The entry adapter of claim 24, wherein the frequency band rejection device is configured to block the client signals from proceeding therethrough to the first port by at least partially reflecting the client signals communicated from any of the plurality of third ports back towards the plurality of third ports.

37. The entry adapter of claim 24, wherein the frequency band rejection device is configured to block the client signals from proceeding therethrough to the first port by attenuating the client signals communicated from any of the plurality of third ports to the first port.

38. The entry adapter of claim 24, wherein the frequency band rejection device is configured to allow the external signals to proceed therethrough bidirectionally between the first port and the plurality of third ports by passing the external signals without significant attenuation.

* * * * *